United States Patent
Young et al.

(10) Patent No.: US 9,663,294 B2
(45) Date of Patent: May 30, 2017

(54) RECEIVING ITEMS INTO INVENTORY

(71) Applicant: Amazon Technologies, Inc., Seattle, WA (US)

(72) Inventors: Eric C. Young, Mercer Island, WA (US); Sriram M. Krishnan, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/591,077

(22) Filed: Jan. 7, 2015

(65) Prior Publication Data

US 2015/0127142 A1    May 7, 2015

Related U.S. Application Data

(63) Continuation of application No. 12/556,765, filed on Sep. 10, 2009, now Pat. No. 8,957,970.

(51) Int. Cl.
| | | |
|---|---|---|
| *G06F 7/00* | (2006.01) | |
| *B65G 1/137* | (2006.01) | |
| *G05B 15/02* | (2006.01) | |
| *B07C 3/14* | (2006.01) | |
| *G06Q 10/08* | (2012.01) | |

(52) U.S. Cl.
CPC .......... *B65G 1/137* (2013.01); *B07C 3/14* (2013.01); *G05B 15/02* (2013.01); *G06Q 10/087* (2013.01)

(58) Field of Classification Search
USPC ....................................................... 700/216
See application file for complete search history.

(56) References Cited

U.S. PATENT DOCUMENTS

| 6,549,891 | B1 | 4/2003 | Rauber et al. |
| 6,974,928 | B2 | 12/2005 | Bloom |
| 7,693,757 | B2 | 4/2010 | Zimmerman |
| 7,769,221 | B1 | 8/2010 | Shakes et al. |
| 2004/0052418 | A1* | 3/2004 | DeLean .................. G06F 21/32 382/209 |
| 2006/0085250 | A1 | 4/2006 | Kantarjiev et al. |
| 2006/0085296 | A1 | 4/2006 | Strickland |
| 2006/0195563 | A1 | 8/2006 | Chapin et al. |
| 2007/0124216 | A1 | 5/2007 | Lucas |
| 2007/0226088 | A1 | 9/2007 | Miles et al. |
| 2007/0276535 | A1 | 11/2007 | Haag |
| 2007/0278298 | A1* | 12/2007 | Ali ......................... G06Q 20/20 235/383 |
| 2008/0082426 | A1 | 4/2008 | Gokturk et al. |
| 2009/0094140 | A1 | 4/2009 | Kwan |

(Continued)

OTHER PUBLICATIONS

Ruzon, et al; U.S. Appl. No. 12/319,992, filed Jan. 14, 2009.

*Primary Examiner* — Kyle Logan
(74) *Attorney, Agent, or Firm* — Thomas | Horstemeyer, LLP

(57) ABSTRACT

The present disclosure involves the receipt of inventory items in a materials handling facility. In one embodiment, a listing of inventory items associated with an inventory is maintained in a memory accessible to a computing device. An attempt is made to identify a match between a first image of a receivable item and a second image of one of the inventory items. If a match is successfully identified, an identifier associated with the one of the inventory items is rendered, where the identifier is to be associated with the receivable item.

20 Claims, 5 Drawing Sheets

(56) References Cited

U.S. PATENT DOCUMENTS

| | | |
|---|---|---|
| 2009/0121017 A1 | 5/2009 | Cato et al. |
| 2009/0226099 A1 | 9/2009 | Kundu et al. |
| 2009/0313556 A1 | 12/2009 | Hamilton, II et al. |
| 2009/0319424 A1 | 12/2009 | Calman et al. |
| 2010/0082152 A1 | 4/2010 | Mishra et al. |
| 2010/0138037 A1 | 6/2010 | Adelberg et al. |
| 2011/0184751 A1* | 7/2011 | Holmes ............... G06F 19/3462 705/2 |

* cited by examiner

RECEIVING ITEMS INTO INVENTORY

CROSS-REFERENCE TO RELATED APPLICATION

This application is a continuation of, and claims priority to, co-pending U.S. patent application entitled "Receiving Items into Inventory," filed on Sep. 10, 2009, and assigned application Ser. No. 12/556,765, which is incorporated herein by reference in its entirety.

BACKGROUND

Various materials handling facilities may be the destination of shipments of many different items each day. For large facilities, the number of shipments and their corresponding items may be very large, numbering in the thousands. For some entities, it is necessary to maintain an accurate count of each of the items received in inventory. However, it can often be the case that shipments enter a materials handling facility that cannot be properly received into inventory due to a lack of identifying information and other problems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
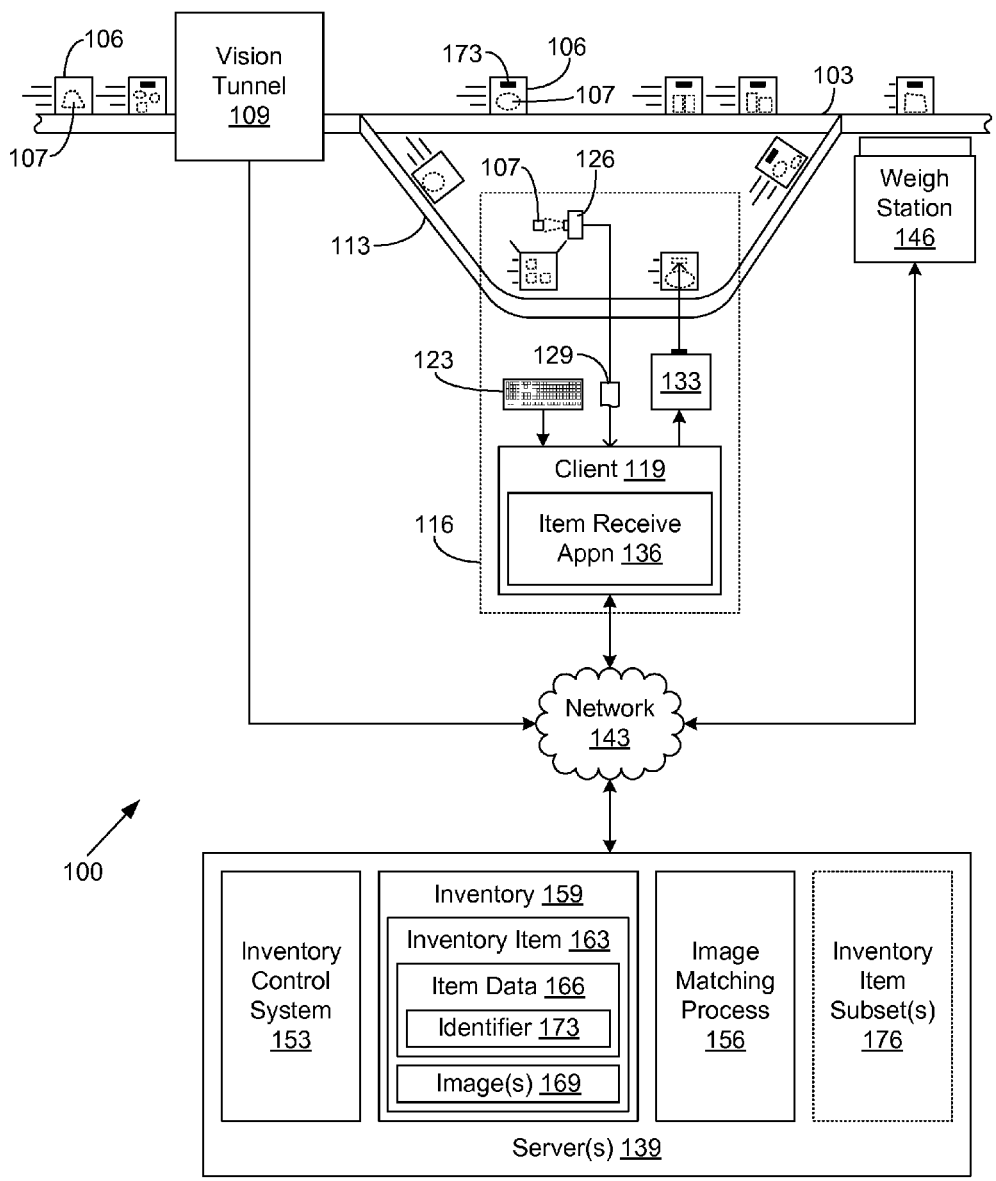
FIG. 1 is a drawing of a receive portion of a materials handling facility according to various embodiments of the present disclosure.

With reference to FIG. 1, shown is a portion of a materials handling facility 100 according to various embodiments. Specifically, shown is a portion of a materials handling facility 100 in which items destined for the materials handling facility 100 are received into an inventory. The materials handling facility 100 includes various conveyors, slides, chutes, or other materials handling structures that create one or more primary pathways 103 that guide the movement of shipments 106 after being unloaded from trucks or other delivery vehicles destined for inventory locations within the materials handling facility 100. Although the primary pathway 103 may be described herein in the singular, it is understood that a materials handling facility 100 may have multiple parallel primary pathways 103 through which shipments 106 or items 107 travel during the receive process. Also, various carts, totes, forklifts, and other materials handling equipment may be employed in the materials handling facility 100 to move shipments 106 or items 107 from place to place.

A shipment 106 may include one or more items 107 that are packed in a box, carton, or other container. Alternatively, a shipment 106 may actually be a single item 107 as can be appreciated. For purposes of the following discussion, reference to a shipment 106 is the same as referring to one or more items 107 that are packaged together. The primary pathway 103 provides for the movement of shipments 106 or items 107 for which no defects or problems have been identified in the receive process so that such shipments 106 may be accepted into inventory.

According to one embodiment, the materials handling facility 100 includes a vision tunnel 109 that is used to perform an automated examination of shipments 106 that are to be received into inventory to identify potential defects. Alternatively, such an examination of shipments 106 may be performed manually.

The materials handling facility 100 includes various exception pathways 113 or other routes along which various shipments 106 may be directed when exceptions or problems are noted such that the shipments 106 cannot be received in inventory for one or more reasons. The exception pathway 113 may comprise, for example, conveyor belts, slides, chutes, or other structures as can be appreciated. The exception pathway 113 may route shipments 106 to an exception station 116 so that corrective action may be taken with respect to a problem noted with the shipment 106 so that the shipment 106 may be received into the inventory of the materials handling facility 100 as will be described.

The exception station 116 includes a client 119. The client 119 is representative of a plurality of types of computing devices or resources that may be employed for the purposes described herein. For example, the client 119 may comprise a processor-based system such as a computer system. Such a computer system may be embodied in the form of a desktop computer, a laptop computer, a personal digital assistant, a cellular telephone, web pads, tablet computer systems, or other devices with like capability.

The client 119 may include, for example various input devices such as, for example, a keyboard 123. The input devices may also comprise, for example, a keypad, touch pad, touch screen, microphone, scanner, mouse, joystick, or one or more push buttons, etc. The client 119 may include various output devices such as a display device, indicator lights, speakers, etc. The display device may comprise, for example, cathode ray tubes (CRTs), liquid crystal display (LCD) screens, gas plasma-based flat panel displays, LCD projectors, or other types of display devices, etc.

In addition, an image capture device 126 is coupled to the client 119. The image capture device 126 may comprise, for example, a digital camera or other appropriate type of capture device that is capable of generating an image or other reproduction of a given shipment 106 or item 107 as will be described. The image capture device 126 generates images 129 that are communicated to the client 119. The exception station 116 also includes one or more printers 133 that print identifiers to be affixed to shipments 106 as will be described. To this end, the printer 133 may comprise a laser printer, ink jet printer, label printer, or any other appropriate type of printer.

Executed in the client 119 is an item receive application 136 that performs various operations to implement corrective action with respect to shipments 106 or items 107 that have not been marked properly by a vendor to be received into inventory as will be described. The client 119 is coupled to a server 139 through a network 143. To this end, the network 143 may comprise, for example, the Internet, intranets, extranets, wide area networks (WANs), local area networks (LANs), wired networks, wireless networks, or other suitable networks, etc., or any combination of two or more such networks. For purposes of convenience, the client 119 and the server 139 may each be referred to herein in the singular. However, it is understood that in one embodiment, the client 119 may represent a plurality of client devices or resources, and the server 139 may represent a plurality of server devices or resources.

In addition, the materials handling facility 100 includes a weigh station 146 coupled to the network 143. The weigh station 146 may comprise, for example, a client device with appropriate scale components to generate a weight of a shipment 106 or item 107 during the receive process. Alternatively, the vision tunnel 109 may include a scale that measures a weight of the shipment 106 or item 107. This may be done to identify shipments 106 or items 107 that do not weigh as much as expected. Such a discrepancy may cause such a shipment 106 or item 107 to be diverted or sidelined for inspection, etc. In such case, the weigh station 146 may be eliminated.

The server 139 comprises one example of a computing device or computing resource that may be employed to execute various components as described herein. The server 139 may comprise, for example, a server computer or like system, and may represent multiple server computers arranged, for example, in one or more server banks or other arrangements. Such server computers may be located in a single installation or may be dispersed among many different geographical locations. To this end, the server 139 may be viewed as a computing resource comprising a server "cloud," for example, that represents the computing capacity of multiple server computers, etc.

The various applications on the server 139 include an inventory control system 153 and an image matching process 156, and/or other applications, services, engines, or functionality not discussed in detail herein. In addition, stored in the data store or other data storage structure is inventory 159. The inventory 159 includes a listing of inventory items 163. Associated with each inventory item 163 is an inventory item description that may include, for example, item data 166 and one or more images 169. The item data 166 includes information about a given inventory item 163, such as, for example, dimensions, weight, features of the inventory item 163, item descriptions, and other information. The item data 166 also includes an identifier 173 that uniquely identifies a respective inventory item 163 in the inventory 159. The identifier 173 associated with each inventory item 163 may comprise, for example, a unique identifier 173 with respect to a given vendor or may be a universally recognized identifier 173 for the respective inventory item 163 that is issued by an independent entity. Such identifiers 173 may comprise, for example, universal product codes (UPC), European article numbers (EAN), global trade item numbers (GTIN), Australian product numbers (APN), or other types of identifiers 173 that uniquely identify a given inventory item 163. The one or more images 169 may depict the item 107, the packaging associated with the item 107, multiple instances of items 107 packed together in an arrangement (i.e. item packages placed together in a box), or other depiction associated with one or more items 107.

During operation, the image matching process 156 may examine various subsets of inventory items 163 ("inventory item subsets" 176) in an attempt to match an image 129 of an item 107 with a respective image 169 of an inventory item 163 in the inventory 159. In one embodiment, the identifiers 173 may also appear on various ones of the shipments 106 when they first arrive at the materials handling facility 100. Unfortunately, some of the shipments 106 may not include an identifier 173, or the identifier 173 may be damaged or separated from the shipment 106 itself during transit. According to various embodiments, one of the errors that is corrected at the exception station 116 comprises a shipment 106 or item 107 that lacks an identifier 173 such that it cannot be recognized, correlated, or matched with a corresponding inventory item 163 listed in the inventory 159 and maintained by the inventory control system 153.

One or more identifiers 173 may be associated with a shipment 106, where each identifier 173 is associated with corresponding ones of the products 107 included in the shipment 106. In some cases, a shipment 106 may include a box that has several different items 107 included therein, thereby necessitating multiple identifiers 173 to be affixed to the box, crate, carton, or other container that comprises the shipment 106. Such a list of identifiers 173 may be affixed to the side of the box that makes up the shipment 106, where each identifier 173 corresponds with a respective item 107. Alternatively, identifiers 173 may be associated or affixed to each of the items 107 within a shipment 106.

In addition, where a vision tunnel 109 is employed to receive shipments 106 and/or items 107 in the materials handling facility 100, the vision tunnel 109 may be employed to perform an automated examination of shipments 106 that include one or more items 107 in an attempt to locate one or more identifiers 173 associated with the items 107 included in the shipment 106 that correspond with identifiers 173 of respective inventory items 163 as described above. In addition, the vision tunnel 109 may examine a shipment 106 for damage or other exceptions such that the shipment 106 or item 107 cannot be received into the inventory of the materials handling facility 100. The vision tunnel 109 may also determine the weight of shipments 106 or items 107 and perform other functions. To this end, the vision tunnel 109 may be better understood with reference to co-pending U.S. patent application Ser. No. 12/241,475, entitled "Systems And Methods For Receiving Shipment Parcels" filed on Sep. 30, 2008, and co-pending U.S. patent application Ser. No. 12/329,927, entitled "Systems And Methods For Receiving Shipment Parcels" filed on Dec. 8, 2008, both of these co-pending patent applications being incorporated herein by reference.

Next, a general description of the operation of the various components of the materials handling facility 100 depicted in FIG. 1 is provided. To begin, shipments 106 of items 107 that arrive at the materials handling facility 100 must be received into inventory. In this respect, the concept of being "received" means that items 107 of a shipment 106 are recognized, correlated, or matched to inventory items 163 tracked in the inventory 159 by the inventory control system 153. In this respect, the inventory control system 153 acts to keep track of the quantities and location of each individual inventory item 163 that is stored in the materials handling facility 100. By knowing the specific quantities of inventory items 163, a merchant can determine when they need to order new items 107 when various inventory items 163 become depleted in the inventory 159. Also, merchants may identify when certain items 107 do not sell and may not order additional items 107 accordingly. In addition, the inventory control system 153 maintains the location of each of the items 107 within the materials handling facility 100 so that such items 107 may be found to fulfill orders for items 107 or for some other purpose. In addition, the inventory control system 153 performs other functions as can be appreciated.

When a shipment 106 with one or more items 107 arrives at the materials handling facility 100, the items 107 associated with the shipment 106 are correlated or matched to inventory items 163 of the listing of inventory 159 maintained by the inventory control system 153. To the extent that identifiers 173 exist on the shipment 106 or on the individual items 107 that correlate such items 107 to respective inventory items 163, then such shipments 106 can be received into the inventory 159 provided there are no other problems such as damage, etc. Thus, the concept of "receiving" an item 107 into the inventory of the materials handling facility 100 refers to the fact that items 107 are recognized as, or correlated/matched to, various inventory items 163. This is possible given that item identifiers 173 associated with a shipment 106 or item 107 correlate or match such items 107 to various inventory items 163 given that the identifiers 173 are also associated with such inventory items 163. The identifiers 173 may comprise digits, words, bar codes, characters, or other identifying indicia that can be placed on or otherwise associated with a shipment 106 or individual items 107.

As mentioned above, in some situations a shipment 106 or item 107 may be sent to a materials handling facility 100 without appropriate identifiers 173, or the identifiers 173 may be damaged or removed in transit.

In such case, such items 107 associated with such shipments 106 may be deemed receivable, but may not be "received" into the inventory 159 as such items 107 cannot be matched with, or correlated to, respective inventory items 163 maintained in the listing of the inventory 159. Until such items 107 can be matched with or correlated to respective inventory items 163, they cannot be received into the inventory 159 as such items 107 are effectively unknown. If such items 107 are placed in the materials handling facility 100 in stocking locations without knowing what they are or how they correlate with the inventory 159, then such items 107 may ultimately be lost unless procedures are employed to implement the recognition of such items 107.

According to one embodiment, shipments 106 or items 107 that arrive at the materials handling facility 100 without appropriate identifiers 173 that allow such items 107 to be recognized are deemed to be an exception and are applied to an exception pathway 113 for resolution of the problem. According to one embodiment, the vision tunnel 109 may serve to implement the automated determination as to whether one or more identifiers 173 are in fact associated with a shipment 106 or the items 107 associated therewith. In such case, where shipments 106 or items 107 do not include identifiers 173 as needed, the vision tunnel 109 may cause such shipments 106 to automatically be guided to the exception pathway 113 for resolution of the problem. In another alternative, personnel may manually determine that identifiers 173 cannot be found with respect to a given shipment 106 or item(s) 107 and may manually route such shipment 106 or items 107 to the exception pathway 113.

According to one embodiment, once a given shipment 106 or item 107 arrives at an exception station 116, one or more items 107 are accessed and the item receive application 136 facilitates the capture of an image 129 of such items 107 using the image capture device 126. The image 129 may comprise an image 129 of a single item 107 or of multiple items 107 packed together in a known configuration. In addition, the item receive application 136 facilitates the input of any corroborating information known about the shipment 106 or item 107 via the keyboard 123 or other input device as can be appreciated. Such corroborating information about the shipment 106 or item(s) 107 may comprise, for example, an order number, a vendor name, an advance shipment notification generated by the vendor, quantities of items 107 within the container making up the shipment 106, purchase orders associated with a delivery vehicle within which the shipment 106 arrived, partial readings of barcodes or other identifiers 173, or any other information that can be obtained from the respective shipment 106. In one embodiment, only the image 129 of the item 107 may be obtained, where no corroborating information is known or otherwise input into the client 119 to minimize the involvement of personnel.

After the image 129 has been generated and corroborating information, if any, has been entered into the client 119 (if any) for one or more items 107 associated with a shipment 106, then the item receive application 136 sends the image 129 and corroborating information (if any) to the image matching process 156 in the server 139.

Upon receiving the image and any corroborating information, the image matching process 156 first identifies one or more inventory item subsets 176 of all of the inventory 159 to be examined in order to determine a match between the image 129 of a respective item 107 and one of the images 169 associated with a given inventory item 163. By matching the image 129 of the item 107 with one of the images 169, the image matching process 156 can correlate the item 107 with one of the inventory items 163.

According to one embodiment, the total number of images 169 that need to be compared with the image 129 obtained of the item 107 is limited to one or more inventory item subsets 176 to increase the accuracy of the matching process. The inventory item subsets 176 are subsets of all of the inventory items 163 listed in the inventory 159. Each of the inventory item subsets 176 are identified based, for example, at least in part upon the corroborating information or other information received from the client 119 in association with a given image 129. For example, the corroborating information may include an order number obtained from the shipment 106 or item 107. It may be the case that several different inventory items 163 are associated with such an order number, but that the total number of inventory items 163 associated with the order is far less than the total number of inventory items 163 stored in the listing of inventory 159.

In such case, the image 129 is compared to the images 169 of those inventory items 163 that are included in the respective order identified by the order number. This significantly reduces the amount of processing required to be performed by the image matching process 156 in order to correlate or match one or more items 107 with respective inventory items 163. For a more detailed discussion of how images 129 of items 107 can be correlated or matched with images 169 of inventory items 163 maintained in the inventory 159, reference is made to U.S. patent application entitled "Method and System for Representing Image Patches" filed on Jan. 14, 2009 and assigned application Ser. No. 12/319, 992, which is incorporated herein by reference in its entirety.

Once a given inventory item subset 176 is identified, then the image matching process 156 proceeds to attempt to match or correlate the image 129 of the respective item 107 with a respective one of the images 169 of the inventory items 163 falling within the inventory item subset 176. Assuming that a match is found such that a given image 129 correlates to the image 169 of a respective inventory item 163, then the image matching process 156 transmits the identifier 173 and potentially other information associated with the inventory item 163 to the client 119. The item receive application 136 then proceeds to cause the printer 133 to print the identifier 173 on an appropriate label, paper, or other medium that can be affixed to or otherwise associated with the respective shipment 106 or item 107. Alternatively, the printer 133 or other output device may render the identifier 173 directly onto a shipment 106 or item 107 in some other manner.

Ultimately, due to the association of an identifier 173 on the shipment 106 or item(s) 107, the items 107 may be associated with respective inventory items 163. Accordingly, such item(s) 107 are "known" with respect to the inventory 159 of the materials handling facility 100 and can be placed in predefined locations designated for such inventory items 163. To this end, it may be desirable to place items 107 in bins, spaces, shelves, cordoned areas, or other inventory locations with similar items 107 that have already been located within the materials handling facility 100. Further, the inventory control system 153 may be made aware of the additional quantity of the items 107 associated with the shipment 106 that are to be received into the inventory 159. Thereafter, the shipment 106 and/or items 107 may be reintroduced into the flow of shipments 106 and/or items 107 that are formally received into the inventory stored in the materials handling facility 100.

Shipments 106 or items 107 may then be applied to the weigh station 146 to weigh the shipment 106 or one or more items 107. The weigh station 146 may communicate with the inventory control system 153 on the server 139 to obtain an expected weight of such items 107 or shipments 106 from the item data 166 associated with such inventory items 163 corresponding to the items 107 from the server 139. Such data may indicate the weight of items 107 individually and/or as grouped together in a container as a shipment 106. To this end, the weigh station 146 can determine whether the measured weight of the shipment 106 and/or one or more items 107 comports with the expected weight of such shipment 106 or items 107 as determined from the weights of items 107 determined from the server 139 to verify that the one or more items 107 are in fact what they purport to be. In addition, in one embodiment it should be noted that the shipment 106 or items 107 may be weighed in the vision tunnel 109, thereby making the weigh station 146 unnecessary.

Assuming that the verification is successful, such items 107 may be deemed as "received" into the materials handling facility 100 where the number of such items 107 may be indicated in the inventory control system 153 and recorded in the inventory 159 in association with the respective inventory items 163. Thereafter, such shipments 106 and/or items 107 may proceed to other stations to be placed into appropriate storage locations within the materials handling facility 100.

In some cases, it may be the case that the image matching process 156 is unable to correlate an image 129 with a respective image 169 of an inventory item 163. This may occur, for example, where the image 129 is flawed in some manner or where the image 169 of the counterpart inventory item 163 that matches the item 107 is flawed. In addition, there may be other reasons why the image matching process 156 is unable to correlate the image 129 of the item 107 with an image 169 of the respective inventory item 163.

In such case, the image matching process 156 transmits a response to the item receive application 136 indicating that a match could not be found. In addition, the image matching process 156 or other process may generate a placeholder identifier that is included in the response that is to be printed or otherwise rendered and associated with the respective shipment 106 or item 107. The placeholder identifier may be employed to allow a shipment 106 or item 107 to be received and stored into inventory in the materials handling facility 100, where the placeholder identifier is used to track the location of the shipment 106 and/or item 107 until the item(s) 107 can be correlated to or matched with one or more respective inventory items 163 in the future.

The item receive application 136 may render a placeholder identifier that is to be physically associated with the item 107 or shipment 106. In one embodiment, the placeholder identifier may be rendered on a sticker or other medium that is attached to or otherwise associated with a shipment 106 or individual item(s) 107 as described above. Thereafter, the shipment 106 and/or item 107 is directed back to the primary pathway 103 be placed in an appropriate inventory location. The weight of the shipment 106 or item 107 may be taken by the weigh station 146 or vision tunnel 109 and stored in a data store in association with a placeholder identifier for future access. The placeholder identifier may be stored in an appropriate data store along with the image 129 and other information that may have been obtained about the item 107 or shipment 106 so that the shipment 106 or item 107 can be manually investigated at a later time to correlate such items 107 or the shipment 106 to respective inventory items 163. Assuming that later investigation ultimately correlates an item 107 or shipment 106 to a respective inventory item 163, then the association between the item 107 and/or shipment 106 and the respective inventory item 163 may be fed back into the image matching process 156 to improve the matching function. For example, an association between the image 129 of an item 107 and the image 169 of an inventory item 163 may be fed back to the image matching process 156 to improve its function. In addition, other data associated with the match may be fed back to the image matching process 156 as may be deemed appropriate.

The one or more items 107 associated with the shipment 106 may be placed into the inventory of the materials handling facility 100 as non-shippable as it may not actually be known what such items 107 are relative to the inventory 159 and, consequently, such items 107 cannot be mated with orders for goods to be shipped. Also, the quantity of such items 107 is not added to the listing of the inventory 159 as the inventory item 163 is not known.

Further attempts to correlate or match the one or more items 107 of a shipment 106 with respective inventory items 163 may be performed after the items 107 are placed in an appropriate location in inventory, where the placeholder identifier is used to track the location of such one or more items 107 or shipments 106. To this end, the materials handling facility 100 may provide for the entry of locations where items 107 may be placed in the materials handling facility 100 in association with the identifiers 173 or placeholder identifiers that are physically associated with such one or more items 107 or shipments 106. For example, a bar code or other identifier associated with an inventory location in the materials handling facility 100 may be scanned or entered at the time that items 107 are placed therein, thereby informing the inventory control system 153 of the location of the items 107 within the materials handling facility 100.

Assuming that subsequent attempts to correlate or match the one or more items 107 of a shipment 106 to one or more inventory items 163 have been successful, then the one or more items 107 of the shipment 106 may be deemed as shippable as they have been correlated with one or more of the inventory items 163 and can now be counted among the inventory 159 that is available to fulfill orders for goods or that is available for other purposes. Further attempts may employ the same procedures as the initial attempt or may employ different approaches. In one embodiment, it may be the case that a new image 129 of an item 107 is captured as there may have been a problem with the previous image 129 that prevented a match from being detected.

Figure 2:
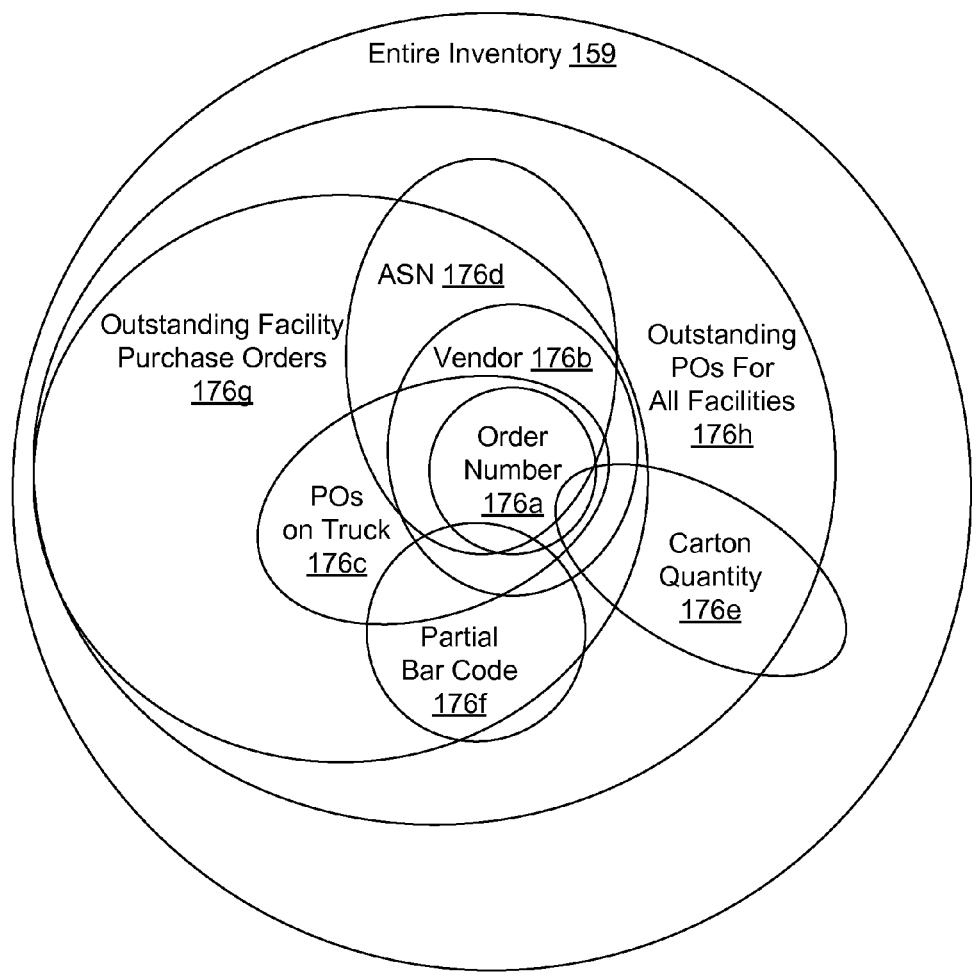
FIG. 2 is a drawing of various subsets of inventory items in the inventory stored in the materials handling facility of FIG. 1 according to various embodiments of the present disclosure.

Referring next to FIG. 2, shown is a Venn diagram that illustrates examples of the inventory item subsets 176 that may be specified for purposes of matching an image 129 (FIG. 1) of an item 107 (FIG. 1) with an image 169 (FIG. 1) of an inventory item 163 (FIG. 1) in order to correlate a given item 107 with the respective inventory item 163 in the inventory 159 according to one embodiment. The Venn diagram includes a number of different inventory item subsets 176 of the inventory 159 as shown. For example, various inventory item subsets 176 may include inventory items 163 (FIG. 1) associated with a common factor or characteristic.

To provide specific examples, an inventory item subset 176 may include all inventory items 163 that are associated with an order number 176a and/or a vendor 176b. An inventory item subset 176 may include all inventory items 163 associated with purchase orders delivered by a given delivery vehicle 176c as indicated by a given manifest, or inventory items 163 associated with an advance ship notification 176d received from a vendor. Further inventory item subsets 176 include all items 107 that are shipped in containers that hold predefined carton quantities 176e, or other factors associated with the shipment 106 (FIG. 1) of items 107.

Also, inventory item subsets 176 may be specified as all inventory items 163 having a predefined partial identifier 176f (i.e. as in the case that an identifier 173 (FIG. 1) or other code was damaged), or inventory items 163 that fall in any one of all of the outstanding purchase orders 176g for a particular materials handling facility 100 (FIG. 1). Note that a partial identifier 176f may actually include a greater or lesser portion of the inventory 159 than is depicted in FIG. 2. In some situations, a partial identifier 176f may include the entire inventory 159. Further, the inventory item subset 176 may include all inventory items 163 that are listed in any outstanding purchase orders 176h for a number of materials handling facilities 100. In addition, inventory item subsets 176 may be drawn around many other factors or characteristics associated with various inventory items 163 as can be appreciated. Further, an inventory item subset 176 may be drawn around any two or more such factors or characteristics.

The specification of the various inventory item subsets 176 aids in the attempt to correlate or match the image 129 of an item 107 with a corresponding image 169 of an inventory item 163 in order to match or correlate the item 107 with a given inventory item 163. To this end, the image matching process 156 may identify the subset of inventory items 163 or their descriptions that have one or more common factors or characteristics such as those described above. Once the inventory item subset 176 is identified, then the image matching process 156 may proceed to attempt to correlate the image 129 of an item 107 with the images 169 of inventory items 163 that fall within the inventory item subset 176 under consideration.

It may be the case that several different inventory item subsets 176 may be identified for a given item 107 under consideration. According to one embodiment, inventory items 163 of the various inventory item subsets 176 are considered in order from the smallest of the inventory item subsets 176 to the largest. Alternatively, the inventory item subsets 176 may be considered in some other order such as in the order of a probability that common factors or characteristics will result in a match. By considering the inventory item subsets 176 in this manner, the probability is increased that a corresponding match will be found more quickly.

For example, if a given inventory item subset 176 comprises the subset of inventory items 163 having a common order number 176a, then it may be the case that there are only a handful of inventory items 163 listed in association with the order number 176a. As such, the image matching process 156 (FIG. 1) need only compare the image 129 with the limited number of images 169 of the respective inventory items 163 falling within the inventory item subset 176a. This would take much less time than would be the case if the image matching process 156 needed to compare the image 129 with all of the inventory items 163 in the entire inventory 159.

Also, the inventory item subset 176a drawn around an order number may provide a much greater probability of a successful match or correlation than and inventory item subset 176f drawn around a partial identifier 173.

In order to aid in identifying a respective inventory item subset 176, the image matching process 156 may access corroborating information about the item 107 entered into the client 119 (FIG. 1) by an appropriate input device such as the keyboard 123 (FIG. 1) as described above, where such corroborating information is forwarded to the server 139 (FIG. 1) by the item receive application 136 (FIG. 1).

Given that multiple inventory item subsets 176 may be considered for a given item 107, it is the case that a given inventory item 163 may appear in multiple inventory item subsets 176. In such case, an inventory item 163 may be marked in the inventory 159 as having already been considered in case that it should appear once again in a second one of the inventory item subsets 176.

In addition, when the image matching process 156 is unable to generate a match or correlate the image 129 of an item 107 with a respective image 169 of an inventory item 163, then the item receive application 136 may render an indication that the item 107 could not be correlated or matched to one of the inventory items 163. Further, an indication may be rendered informing personnel at the exception station 116 that the identifier 173 rendered by the printer 133 or other output device is a placeholder identifier.

Figure 3:
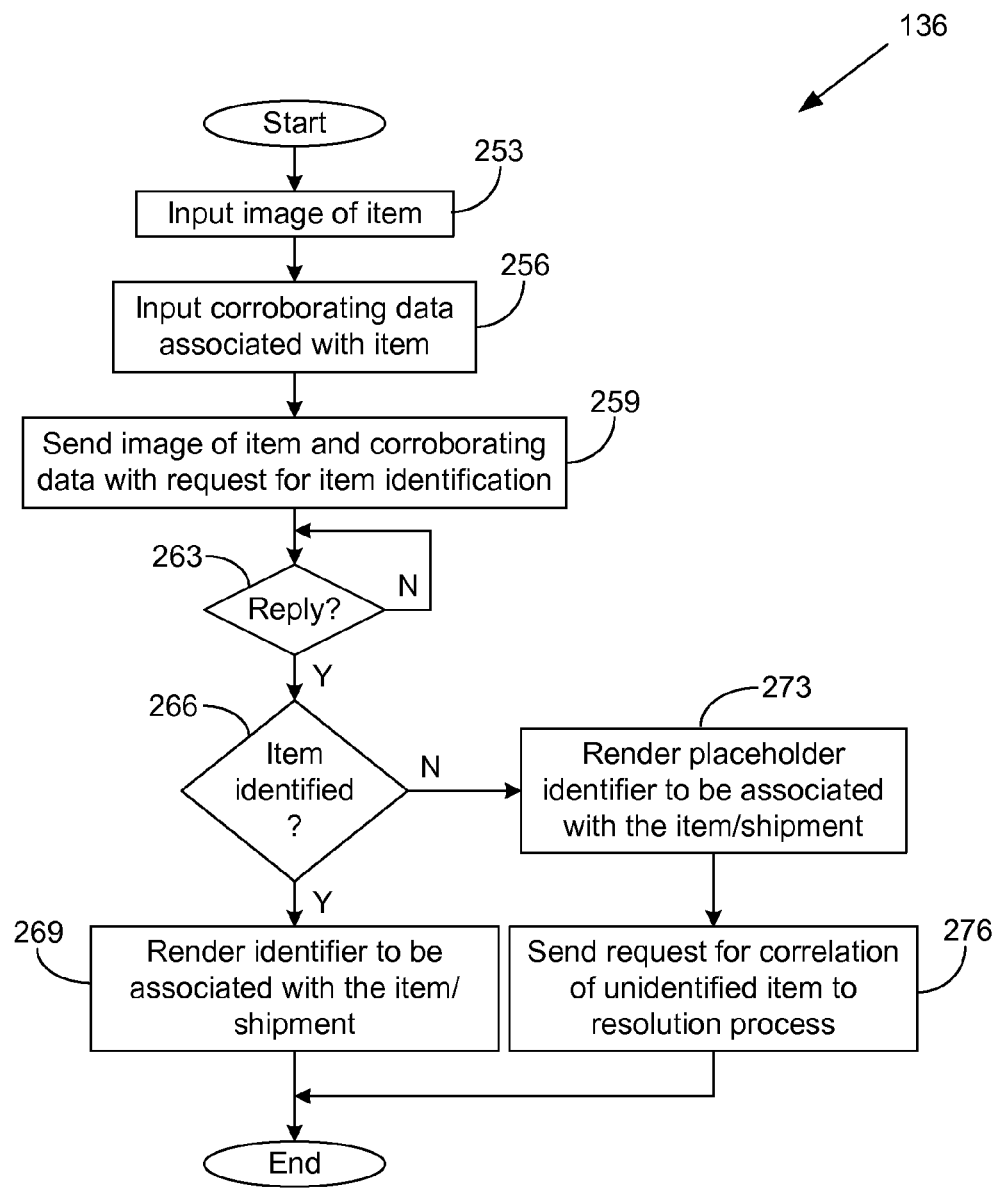
FIG. 3 is a drawing of a flowchart that illustrates one example of functionality implemented in a computing device in a network in the receive portion of the materials handling facility of FIG. 1 according to various embodiments of the present disclosure.

With reference to FIG. 3, shown is a flowchart that provides one example of the operation of the item receive application 136 according to various embodiments. Alternatively, the flowchart of FIG. 3 may be viewed as implementing various steps of a method to process an exception for a shipment 106 (FIG. 1) that may include one or more items 107 (FIG. 1) due to lack of a proper identifier 173 (FIG. 1) that can be correlated or matched to a respective inventory item 163 (FIG. 1) maintained in the inventory 159 (FIG. 1) of the materials handling facility 100 (FIG. 1).

The flowchart of FIG. 3 depicts the functionality of the item receive application 136 in processing a given exception. To begin, in box 253, the item receive application 136 inputs an image 129 (FIG. 1) of an item 107. This may be implemented by personnel manipulating the image capture device 126 (FIG. 1) causing the capture of an image 129 of the item 107 that is sent to the client 119 (FIG. 1) and received as an input by the item receive application 136. Note that the image capture device 126 may be positioned a relative distance from the item 107 that roughly matches the distance of an image capture device 126 in taking the image 169 (FIG. 1) of the respective counterpart inventory item 163. This potentially would increase the probability of a match being found between respective items 107 and inventory items 163 as the images 129/169 are more likely to be similar or the same if the images 129/169 are captured by an image capture device 126 that is positioned the same distance from the respective item 107 and inventory item 163. To this end, standardized distances between the items 107 and the image capture device 126 may be specified to increase the probability of successful matching or correlation.

Next, in box 256, the item receive application 136 inputs any corroborating information or data associated with the item 107 for which the image 129 was captured. To do this, personnel may enter various information about the item 107 including the vendor name associated with the item 107, the number of items 107 packed in a given carton, an order number associated with the shipment 106/item 107, or any other information as can be appreciated. To this end, the item receive application 136 may present appropriate user interfaces with respective fields for personnel to enter information as described above.

Thereafter, in box 259, the image 129 of the item 107 and any corroborating information or data input into the client 119 is sent along with a request for item identification to the image matching process 156 (FIG. 1) on the server 139 (FIG. 1). Thereafter, in box 263, the item receive application 136 waits to receive a reply. In box 266, assuming that a reply has been received, if the item 107 has been identified such that a match exists between the image 129 of the item 107 and a respective image 169 of an existing inventory item 163, then the item receive application 136 proceeds to box 269. Otherwise, the item receive application 136 proceeds to box 273.

Assuming that a match has been identified between the image 129 of a respective item 107 and an image 169 of a respective inventory item 163 in box 266, then in box 269 the item receive application 136 implements the rendering of an identifier 173 to be associated with the item 107 and/or the shipment 106 as described above. In one embodiment, the identifier 173 may be rendered on a label in the form of a bar code or other type of code using a printer 133 (FIG. 1) that operates at the direction of the item receive application 136. According to one embodiment, the identifier 173 is physically associated with a given item 107 or shipment 106 by virtue of being rendered on a sticker that is attached to an item 107 or shipment 106. Alternatively, identifiers 173 may be printed directly onto an item 107 or shipment 106 or may be associated with the same in some other manner. Thereafter, the item receive application 136 ends until the next shipment 106 or item 107 is to be considered.

Referring back to box 266, if a match or correlation is not identified between a respective item 107 and an inventory item 163 such that an identifier 173 is located for the item 107 or shipment 106, then the item receipt application 136 proceeds to box 273 in which a placeholder identifier is rendered to be associated with the respective item 107 or shipment 106. The placeholder identifier is maintained in an appropriate data store so that the item 107 or shipment 106 can be tracked in terms of where it is stored within the materials handling facility 100 as described above so that subsequent attempts to correlate the one or more items 107 of the shipment 106 with respective inventory items 163 can be made. Also, any information about the shipment 106 may be stored in association with the placeholder identifier such as the measured weight of the shipment 106 or item 107, a description of the shipment 106 or item 107, or any other information.

Thereafter, in box 276, a request for further correlation or matching attempts of the unidentified one or more items 107 that are included in the shipment 106 is sent to a resolution process. According to one embodiment, the resolution may comprise a manual process of investigation performed by personnel of the materials handling facility 100. Alternatively, other processes may be employed in an attempt to identify a match or correlation between items 107 and inventory items 163 as can be appreciated. In one embodiment, a new image 129 of the item 107 may be captured and the image matching process 156 may be caused to repeat the attempt to match the new image 129 with a counterpart image 169 associated with a respective inventory item 163. Thereafter, the item receive application 136 ends as shown.

Figure 4:
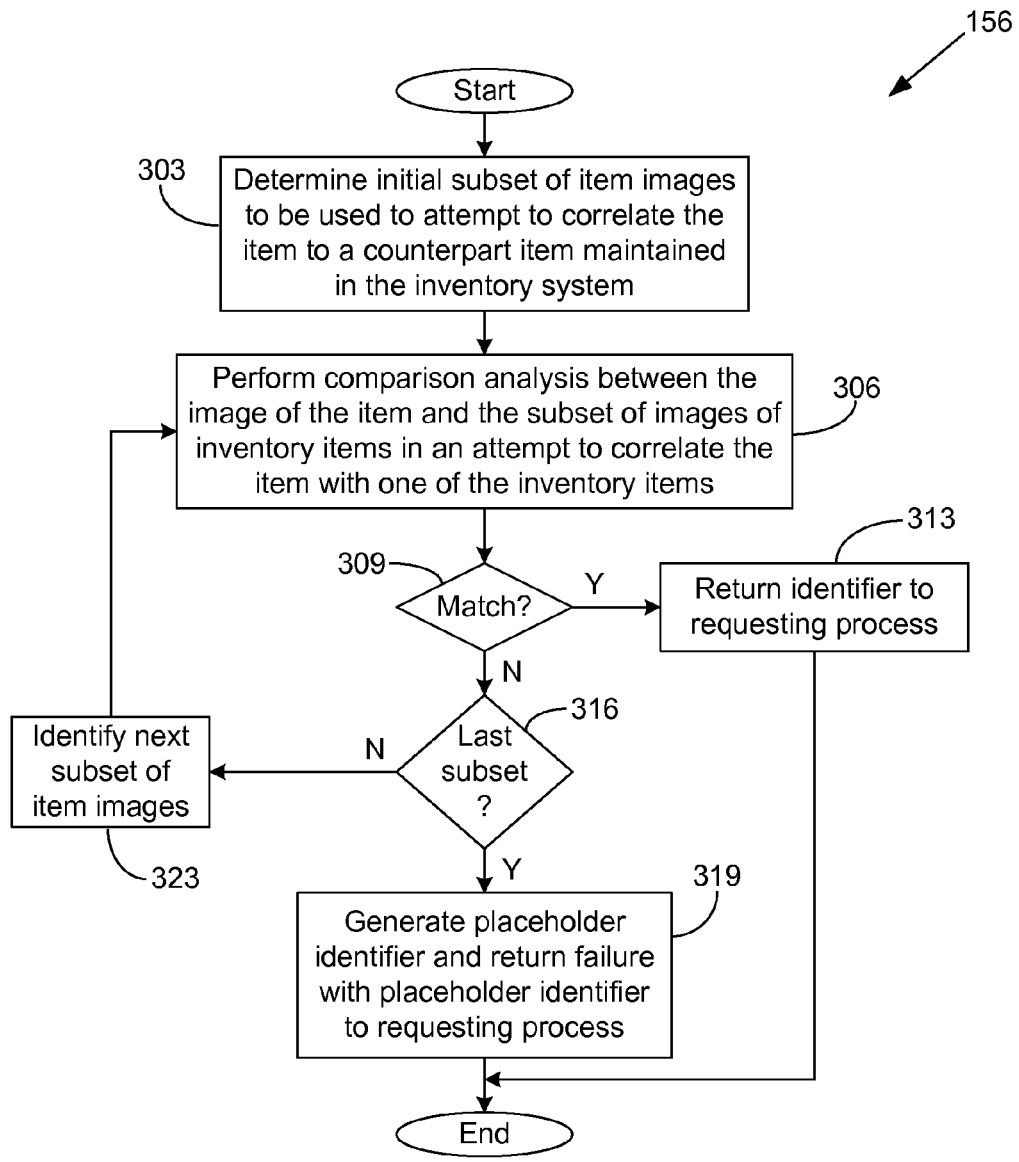
FIG. 4 is a drawing of a flowchart that illustrates one example of functionality implemented in a computing device in a network in the receive portion of the materials handling facility of FIG. 1 according to various embodiments of the present disclosure.

Referring next to FIG. 4, shown is an example of the image matching process 156 according to various embodiments. Alternatively, the flowchart of FIG. 4 may be viewed as depicting steps of a method implemented in the server 139 (FIG. 1) in order to identify a match or to otherwise correlate the image 129 (FIG. 1) of an item 107 (FIG. 1) with an image 169 (FIG. 1) of a respective inventory item 163 (FIG. 1). The flowchart of FIG. 4 depicts functionality that is implemented each time a request is received from the item receive application 136 (FIG. 1) as described above.

Beginning with box 303, the image matching process 156 first determines an initial subset of the images 169 of the inventory items 163 to be used to attempt to correlate or otherwise match the image 129 of an item 107 to a counterpart inventory item 163 maintained in the listing of the inventory 159 (FIG. 1) by the inventory control system 153. This may be done first by identifying all of the potential inventory item subsets 176 (FIG. 1) that apply to the respective item 107 based at least in part upon any corroborating information obtained from the client 119 (FIG. 1) or based on other information known about the item 107. To this end, corroborating information may be used to limit the potential pool of inventory items 163 to one or more inventory item subsets 176.

For example, if the corroborating information includes a purchase order number 176a (FIG. 2), then one inventory item subset 176a may be limited to those inventory items 163 that are listed in the given purchase order. To this end, the common factor among such inventory items 163 is the purchase order itself. Once all of the potential inventory item subsets 176 have been identified, then an initial one of the inventory item subsets 176 to be considered is selected. According to one embodiment, this initial inventory item subset 176 may comprise the smallest of all of the inventory item subsets 176. Alternatively, the initial inventory item subset 176 selected may be that deemed to be the most likely to result in a match between the image 129 of the item 107 and an image 169 of a respective inventory item 163.

To this end, the common factor used to generate a given inventory item subset 176 may indicate whether such inventory item subset 176 is more likely to result in a match or correlation between respective images 129/169. For example, a purchase order number that typically relates to a purchase order for a small group of items 107 may be more likely to result in a match than would an inventory item subset 176 based on carton quantities 176e (FIG. 2) or other factors.

Assuming that the initial inventory item subset 176 has been determined in box 303, then in box 306, the image matching process 156 performs a comparison analysis between the image 129 of the item 107 and the subset of images 169 associated with the respective inventory items 163 that fall into the respective inventory item subset 176 in an attempt to correlate the item 107 with a respective one of the inventory items 163. This analysis may be performed using appropriate methods such as those described in the U.S. patent application entitled "Method and System for Representing Image Patches" filed on Jan. 14, 2009 and assigned application Ser. No. 12/319,992, which is incorporated herein by reference above.

Thereafter, in box 309, the image matching process 156 determines whether a match has been detected such that the item 107 correlates to a respective inventory item 163. If so, then the image matching process 156 proceeds to box 313. Otherwise, the image matching process 156 progresses to box 316.

In box 313, the image matching process 156 returns an identifier 173 to the requesting process such as the item receive application 136 (FIG. 1). Such identifier 173 is associated with the respective inventory item 163 to which the item 107 correlates or matches as described above. Thereafter, the image matching process 156 ends.

In box 316, the image matching process 156 determines whether the last one of the identified inventory item subsets 176 has been examined. If so, then the image matching process 156 proceeds to box 319. Otherwise, the image matching process 156 moves to box 323.

In box 319, the image matching process 156 generates a placeholder identifier that is included with a message that is sent to the item receive application 136 indicating a failure to correlate or otherwise match the image 129 of the item 107 with an image 169 of a respective inventory item 163. Alternatively, where a placeholder identifier is not employed, then the return message may simply indicate a failure to match the image 129 with a respective image 169. Thereafter, the image matching process 156 ends. However, assuming that the image matching process 156 proceeds to box 323, then a next one of the inventory item subsets 176 of the inventory items 163 identified as described above is designated for further scrutiny. The next one of the inventory item subsets 176 selected for consideration may comprise the next largest one of the subsets 176 identified in box 303 above. In this manner, the pool of images 169 of inventory items 163 considered in attempting to identify a match with the image 129 expands with each iteration of the loop. Alternatively, the next one of the inventory item subsets 176 may comprise the subset that is the next most likely to result in a match, etc. Thereafter, the image matching process 156 reverts back to box 306 as shown.

Figure 5:
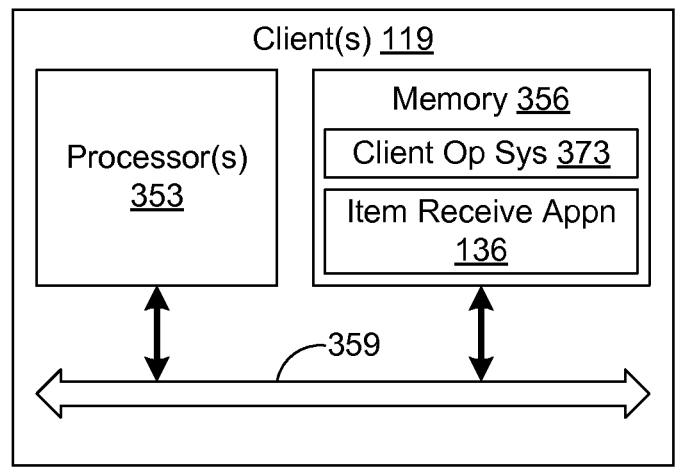
FIG. 5 is a schematic block diagram of one example of the computing device implementing the functionality illustrated in FIG. 3 according to various embodiments of the present disclosure.
Figure 6:
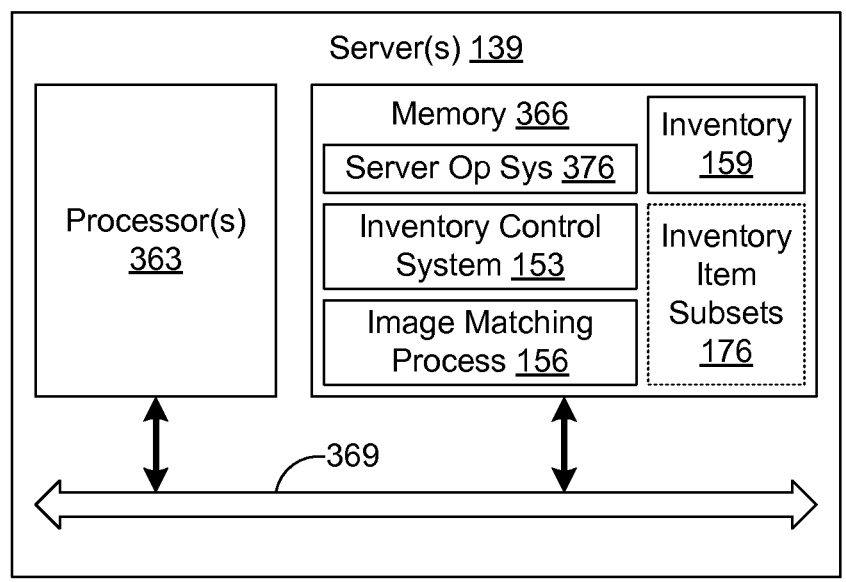
FIG. 6 is a schematic block diagram of one example of the computing device implementing the functionality illustrated in FIG. 4 according to various embodiments of the present disclosure.

Referring next to FIGS. 5 and 6, shown are schematic block diagrams of examples of computing resources and/or devices such as a client 119 and server 139 according to embodiments of the present disclosure.

The client 119 includes at least one processor circuit, for example, having a processor 353 and a memory 356, both of which are coupled to a local interface 359. To this end, the client 119 may comprise, for example, a computer system or other device as described above.

The server 139 includes at least one processor circuit, for example, having a processor 363 and a memory 366, both of which are coupled to a local interface 369. To this end, the server 139 may comprise, for example, a server computer or other device as described above. The local interface 369 may comprise, for example, a data bus with an accompanying address/control bus or other bus structure as can be appreciated.

Stored in the memories 356/366 are both data and several components and/or applications that are executable by the processors 353/363. In particular, stored in the memory 356 and executable by the processor 353 are a client operating system 373 and the item receive application 136, and potentially other applications, etc. Stored in the memory 366 and executable by the processor 363 are a sever operating system 376, the inventory control system 153, the image matching process 156, and potentially other systems and applications, etc.

Also, stored in the memory 366 is a data store or other data storage structure in which are stored the various data items described above so as to be accessible to the processor 363. For example, such stored data may comprise the inventory 159. In addition, during the execution of the inventory control system 153, one or more inventory item subsets 176 may be generated and stored in the memory 366 as described above. It is understood that other data may be stored in the memories 356/366 and accessed by the processors 353/363 beyond the data described above.

A number of software components are stored in the memories 356/366 and are executable or executed by the processors 353/363. In this respect, the term "executable" means a program file that is in a form that can ultimately be run by the processors 353/363. Examples of executable programs may be, for example, a compiled program that can be translated into machine code in a format that can be loaded into a random access portion of the memories 356/366 and run by the processors 353/363, source code that may be expressed in proper format such as object code that is capable of being loaded into a random access portion of the memories 356/366 and executed by the processors 353/363, or source code that may be interpreted by another executable program to generate instructions in a random access portion of the memories 356/366 to be executed by the processors 353/363, etc. An executable program may be stored in any portion or component of the memories 356/366 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each memory 356/366 is defined herein as both volatile and nonvolatile memory and data storage components. Volatile components are those that do not retain data values upon loss of power. Nonvolatile components are those that retain data upon a loss of power. Thus, each memory 356/366 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, each of the processors 353/363 may represent multiple processors and each of the memories 356/366 may represent multiple memories that operate in parallel. In such a case, each local interface 359/369 may comprise an appropriate network that facilitates communication between any two of the multiple processors, between any processor and any one of the memories, or between any two of the memories, etc. Each local interface 359/369 may comprise additional systems designed to coordinate this communication, including, for example, performing load balancing. Each processor 353/363 may be of electrical or of some other available construction.

The various applications or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as the item receive application 136, the inventory control system 153, and the image matching process 156 described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-4 show the functionality and operation of an implementation of the various applications and/or other components such as the item receive application 136 and the image matching process 156 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and/or other components described herein such as the item receive application 136, the inventory control system 153, and the image matching process 156 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying at least one program executable in at least one computing device, the at least one program having instructions that perform operations comprising:

detecting a failed attempt to recognize a predefined identifier associated with a receivable item;

accessing a listing of inventory items associated with an inventory;

obtaining corroborating information associated with the receivable item;

identifying a subset of the inventory items from the listing that is associated with the corroborating information;

attempting to identify a match between a first image of the receivable item and a second image of one of the inventory items in the subset of the inventory items; and facilitating a rendering of an item identifier associated with the one of the inventory items in the subset of the inventory items to be associated with the receivable item if the match is successfully identified.

2. The non-transitory computer readable medium of claim 1, wherein the corroborating information comprises an order number for a shipment in which the receivable item was received, a vendor name, an advance shipment notification generated by a vendor, a quantity of items within a container making up the shipment, a purchase order associated with a delivery vehicle within which the shipment arrived, or a barcode identifier.

3. The non-transitory computer readable medium of claim 1, the operations further comprising detecting that the item identifier is missing from the receivable item and implementing a rendering of a replacement item identifier to be physically associated with the receivable item if the match is successfully identified.

4. A system, comprising:
a listing of inventory items that is maintained in a memory accessible to at least one computing device;
an image capture device that captures a first image of a receivable item; and
the at least one computing device configured to perform:
obtaining, by the at least one computing device, corroborating information associated with the receivable item;
determining, by the at least one computing device, a subset of the inventory items that is associated with at least the corroborating information;
attempting, by the at least one computing device, to identify a match between the first image of the receivable item and a second image of one of the inventory items in the subset of the inventory items; and
rendering, by the at least one computing device, an indication that the receivable item was positively correlated to the one of the inventory items in the subset of the inventory items if the match is successfully identified.

5. The system of claim 4, wherein the corroborating information comprises an order number for a shipment, a vendor name, an advance shipment notification generated by a vendor, a quantity of items within a container making up the shipment, a purchase order associated with a delivery vehicle within which the shipment arrived, or a barcode identifier.

6. The system of claim 4, wherein the at least one computing device further comprises at least one input device that facilitates an input of at least one corroborating item of information associated with the receivable item.

7. The system of claim 4, wherein a plurality of subsets of inventory items is associated with the corroborating information, the at least one computing device being further configured to select the subset of inventory items which contains a smallest number of members for which the match is attempted to be identified.

8. The system of claim 4, wherein the at least one computing device is further configured to determine that the subset of the inventory items is associated with the corroborating information and an additional common characteristic shared with the receivable item.

9. The system of claim 4, wherein the at least one computing device is further configured to detect that a portion of an item identifier is missing from the receivable item and to implement a rendering of a replacement item identifier to be physically associated with the receivable item if the match is successfully identified.

10. The system of claim 9, wherein the corroborating information comprises a partial item identifier obtained from a portion of the item identifier that is not missing from the receivable item.

11. The system of claim 9, wherein the at least one computing device is further configured to implement a rendering of a placeholder item identifier to be physically associated with the receivable item if the match is not successfully identified.

12. A method, comprising:
storing a listing of a plurality of inventory items in a memory accessible by at least one computing device, the listing of the plurality of inventory items including first images of inventory items;
capturing a second image of a receivable item;
obtaining corroborating information associated with the receivable item;
determining, by the at least one computing device, a subset of the inventory items that is associated with at least the corroborating information;
attempting, by the at least one computing device, to correlate the second image of the receivable item to one of the first images of the subset of the inventory items; and
rendering, by the at least one computing device, an indication that the receivable item was positively correlated to one of the inventory items in the subset of the inventory items if the second image is successfully correlated with a first image of the one of the inventory items in the subset of the inventory items.

13. The method of claim 12, further comprising rendering a replacement item identifier associated with the one of the inventory items in the subset of the inventory items to be associated with the receivable item if the second image is successfully correlated with the first image of the one of the inventory items in the subset of the inventory items.

14. The method of claim 12, further comprising:
obtaining a weight associated with the one of the inventory items in the subset of the inventory items that corresponds to the first image of the one of the inventory items in the subset of the inventory items;
weighing the receivable item; and
verifying that the second image correlates to the first image of the one of the inventory items in the subset of the inventory items by determining whether a measured weight of the receivable item comports with the weight associated with the one of the inventory items in the subset of the inventory items.

15. The method of claim 12, further comprising rendering a placeholder item identifier to be physically associated with the receivable item if the second image is not successfully correlated to one of the first images of the inventory items in the subset of the inventory items.

16. The method of claim 12, further comprising designating the receivable item within an inventory as non-shippable when the receivable item cannot be correlated with one of the inventory items.

17. The method of claim 12, wherein the corroborating information comprises an order number for a shipment, a vendor name, an advance shipment notification generated by a vendor, a quantity of items within a container making up the shipment, a purchase order associated with a delivery vehicle within which the shipment arrived, or a barcode identifier.

18. The method of claim 12, wherein the subset of the inventory items is determined to be associated with the corroborating information and an additional common characteristic shared with the receivable item.

19. The method of claim 12, wherein a plurality of subsets of inventory items is associated with the corroborating information, the method further comprising selecting the subset of the inventory items which contains a smallest number of members for which the successful correlation is attempted.

20. The method of claim 19, wherein the plurality of subsets is considered, in the attempt to correlate, in a progression based upon a count of the inventory items in each respective subset, the progression proceeding from smallest to largest count.

* * * * *